(12) United States Patent
Veryha et al.

(10) Patent No.: US 10,353,371 B2
(45) Date of Patent: Jul. 16, 2019

(54) METHOD AND SYSTEM FOR SAFETY-RELEVANT INPUT TO A CONTROL SYSTEM

(71) Applicant: ABB AG, Mannheim (DE)

(72) Inventors: Yauheni Veryha, Mannheim (DE); Heinrich Neupaertl, Lampertheim (DE); Thomas Ewald, Worms (DE)

(73) Assignee: ABB AG, Mannheim (DE)

( * ) Notice: Subject to any disclaimer, the term of this patent is extended or adjusted under 35 U.S.C. 154(b) by 101 days.

(21) Appl. No.: 15/716,528

(22) Filed: Sep. 27, 2017

(65) Prior Publication Data

US 2018/0024522 A1   Jan. 25, 2018

Related U.S. Application Data

(63) Continuation of application No. PCT/EP2016/058049, filed on Apr. 13, 2016.

(30) Foreign Application Priority Data

Jul. 1, 2015  (EP) ..................................... 15001952
Sep. 18, 2015  (EP) ..................................... 15002709

(51) Int. Cl.
*G05B 19/05* (2006.01)
*G05B 19/042* (2006.01)

(52) U.S. Cl.
CPC ....... *G05B 19/058* (2013.01); *G05B 19/0428* (2013.01); *G05B 2219/13023* (2013.01); *G05B 2219/13144* (2013.01); *G05B 2219/14006* (2013.01); *G05B 2219/15123* (2013.01); *G05B 2219/24165* (2013.01)

(58) Field of Classification Search
CPC ............ G05B 19/0058; G05B 19/0428; G05B 2219/1406
See application file for complete search history.

(56) References Cited

U.S. PATENT DOCUMENTS 9,599,970 B2 *  3/2017  Reed ....................... B29C 39/24
2011/0202146 A1  8/2011  Heil et al.
2012/0036493 A1  2/2012  Moosmann et al.
(Continued)

FOREIGN PATENT DOCUMENTS

EP   2413484 A2   2/2012
EP   2551787 B1   1/2013
EP   2879008 A1   6/2015

*Primary Examiner* — Mark A Connolly
(74) *Attorney, Agent, or Firm* — Leydig, Voit & Mayer, Ltd.

(57) ABSTRACT

A system and a method for safety relevant input to a control system, the control system including a PLC which includes a non-safety control module for controlling non-safety processes, and a safety control module for controlling functional safety of processes, the system further including an operator panel for user selection of safety-related object input, wherein the system includes two communication paths between the operator panel and the safety control module, that each of the communication paths uses a different communication protocol, that each communication path goes through the non-safety control module to and from the safety control module, that the first communication path transfers object code and the second communication path transfers masked object code.

15 Claims, 6 Drawing Sheets

(56) References Cited

U.S. PATENT DOCUMENTS

| | | | | |
|---|---|---|---|---|
| 2012/0296446 A1* | 11/2012 | Neupartl | ............ | G05B 19/0428 700/1 |
| 2012/0297101 A1* | 11/2012 | Neupartl | .............. | G05B 19/058 710/110 |

* cited by examiner

METHOD AND SYSTEM FOR SAFETY-RELEVANT INPUT TO A CONTROL SYSTEM

CROSS-REFERENCE TO RELATED APPLICATIONS

This application is bypass continuation of International Application No. PCT/EP2016/058049, filed on Apr. 13, 2016, and claims benefit to European Patent Applications No. 15 001 952.9 and 15 002 709.2, respectively filed on Jul. 1, and Sep. 18, 2015, the entire disclosure of each of which is hereby incorporated by reference herein. The International Application was published in English on Jan. 5, 2017, as WO 2017/001074 A1 under PCT Article 21(2).

FIELD

The present invention is about a method and a system for safety-relevant input to a control system.

BACKGROUND

EP 2 551 787 B1 discloses a device for safety-relevant input, comprising a display device with touch input, in particular by means of a touch screen, with an acquisition module for acquiring different touch inputs on the display; an image data line for transmitting image data from a computer unit to the display device, and a test unit connected to the image data line and connected to the acquisition module of the display device or to an additional acquisition module for selecting a monitoring region, wherein the monitoring region corresponds to that partial region, in which a touch input occurred; and which is adapted for generating a test code for that part of the image data which are to be displayed in the monitoring region, and for outputting resp. reading out the generated test code, in particular in view of initiating a safety-focused reaction.

So in prior art systems and methods for triggering safety actions from operator panels are known, but these known systems require hardware changes in standard operator panels if such standard operator panels are to be used for safety-related input. As a result, in prior art solutions significant additional efforts are often needed for modifications, e.g., in communication, interfaces, control part, etc. of standard operator panels to realize the functionality of triggering safety actions from such operator panels.

SUMMARY

An aspect of the invention provides a method for safety-relevant input to a control system, the control system including a non-safety control module configured to control non-safety processes, and a safety control module configured to control functional safety of processes, the method comprising, using an operator panel for user selection of safety-related object input: selecting a safety-related object on the operator panel; transferring object code and masked object code between the operator panel and the safety control module in both directions; using two different communication paths, a first communication path for the object code and a second communication path for the masked object code, each communication path going through the non-safety control module; and using reference code values stored on the safety control module for verifying for correctness the object code and the masked object code received in the safety control module.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

An aspect of the invention is about a method and a system for safety-relevant input to a control system, said control system including a PLC, which stands for a Programmable Logic Controller, wherein the control system includes a non-safety control module for controlling non-safety processes, and a safety control module for controlling functional safety processes, the system further including an operator panel for user selection of safety-related object input by means of an operator panel. An aspect of the invention is related to functional safety control systems in factory and process automation applications.

So it is an aspect of the present invention to create a system and a method for safety-relevant input to a control system which does not require changes in standard operator panel hardware to trigger safety actions.

According to an aspect of the invention, the method comprises the steps of select a safety-related object on the operator panel, transfer object code and masked object code between the operator panel and the safety control module in both directions, using two different communication paths, a first one for the object code and a second on for the masked object code, each communication path going through the non-safety control module, use reference code values stored on the safety control module for verifying the correctness of the object code and the masked object code received in the safety control module.

The method according to an aspect of the invention thus allows the use of standard operator panels for triggering safety actions.

It is an advantage of an aspect of the inventive method for triggering safety actions using operator panels that it can be used for safety applications in which safety function execution is guaranteed by the functional safety control system even without Operator Panel(s). The main purpose of Operator Panel(s) usage in such applications is to enable modifications in functional safety control system configuration behavior, e.g., changing safely limited speed values, selected shut-down, etc., with the satisfaction of SIL (Safety Integrity Level, as defined in IEC 61508:2010) or other functional safety standards.

A standard operator panel in the context of an aspect of the present invention can be for example a display device with touch input, in particular by means of a touch screen, such as for example, but not limited to, a tablet PC, smartphone or the like.

According to a preferred embodiment of the invention, each communication path uses a different communication protocol.

According to a preferred embodiment of the invention each communication path is built on the same or different physical layer(s).

According to a preferred embodiment of the invention each communication path is not realized as a safety communication path.

According to a preferred embodiment of the invention the safety control module includes two safety CPUs (microprocessor, flash memory, RAM, etc.) which build a 1oo2 safety architecture.

According to a preferred embodiment of the invention the masked object code is demasked in the safety control module and the reference code values are compared with the received object code and masked object code after demasking, and an error is detected in case the received codes do not correspond to the reference code value.

A system for safety relevant input to a control system according to an aspect of the invention includes a PLC which includes a non-safety control module for controlling non-safety processes, and a safety control module for controlling functional safety processes, and is characterized in that the said system includes two communication paths between the operator panel and the safety control module, that each of the communication paths uses a different communication protocol, that each communication path goes through the non-safety control module to and from the safety control module, that the first communication path transfers object code and the second communication path transfers masked object code.

According to a preferred embodiment of the invention both communication paths are implemented on the same or different physical layer.

According to a preferred embodiment of the invention the safety control module includes a storage module for storing pre-defined code reference values for each user selection.

According to a preferred embodiment of the invention the safety control module includes a program memory for storing a safety application program, which program is configured to compare the user selection received in the safety control module from the operator panel with the stored code reference values and to detect an error in case the received user selection does not correspond to the stored code reference value.

According to a preferred embodiment of the invention the safety application program is configured to demask the incoming masked object code and compare the demasked object code with the object code delivered through the other communication path, the stored code reference values and to detect an error in case the demasked object code and object code do not correspond to the stored code reference value.

According to a preferred embodiment of the invention the safety control module includes two safety CPUs which build a 1oo2 safety architecture.

According to a preferred embodiment of the invention more than one operator panels can be connected to the control system.

According to a preferred embodiment of the invention more than one control system can be connected to the operator panel.

The invention and further advantages of the method and system according to the invention will now be described in more detail with reference to the figures.

The main idea of this invention is to provide a system and method on how to trigger functional safety actions using standard operator panels.

Figure 1:
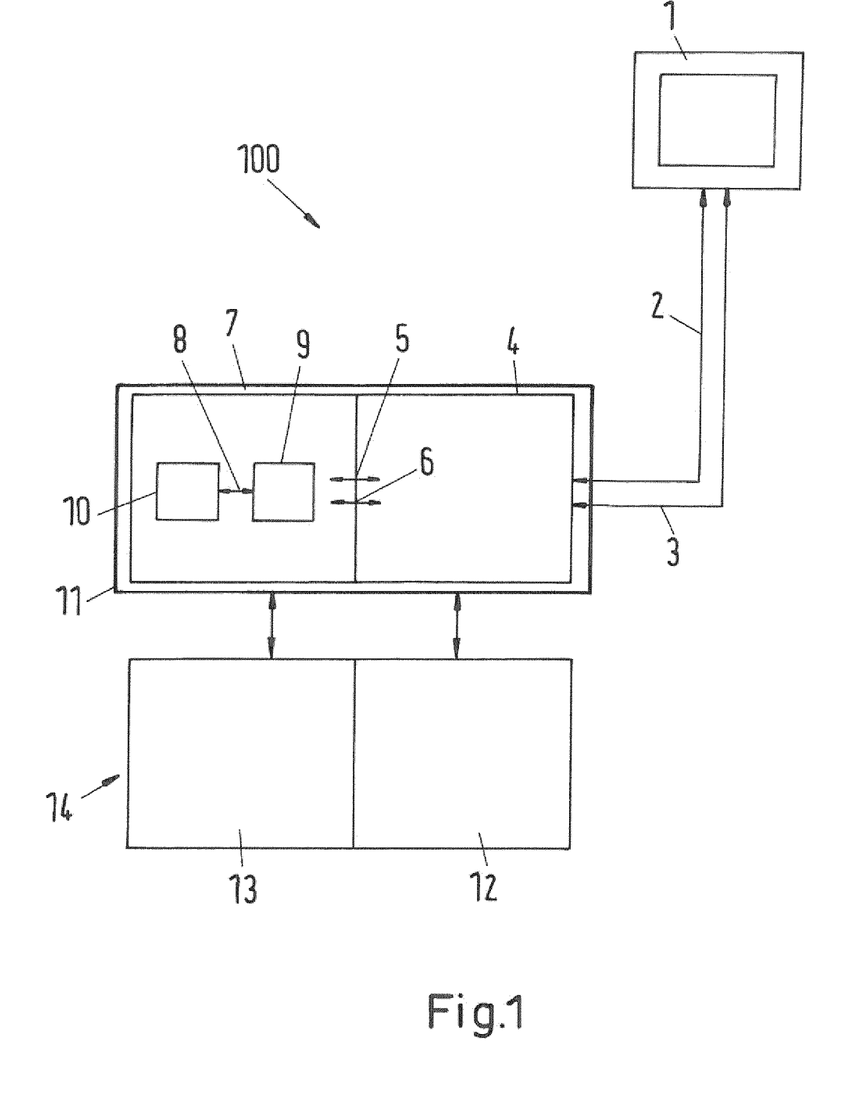
FIG. 1 schematically and exemplarily a system according to an embodiment of the invention.

Referring to FIG. 1, the system includes an operator panel 1, or more than one operator panels, if required, connected to the PLC, Programmable Logic Controller, 11 which includes a non-safety CPU module 4 and a safety CPU module 7. The operator panel 1 in the example here is a display device with touch input, in particular by means of a touch screen, such as for example a tablet PC.

The non-safety CPU module 4 is for controlling a non-safety process 12, and the safety CPU module 7 is for controlling a functional safety of process 13. Non-safety process 12 and functional safety of process 13 together make up the process or machine 14 to be controlled by the PLC 11.

The operator Panel 1 has two communication paths to the safety CPU module 7 through the non-safety CPU module 4. Those communication paths are different to each other, e.g., they use different communication protocols, and go through the non-Safety CPU module 4 to the safety CPU module 7 to transfer code and masked code values in both directions, based on a selection made by on the operator panel 1.

Each communication path can be split in two parts, respectively, 2, 5 and 3, 6. Part 1 leads from the operator Panel to the non-safety CPU 4, and part 2 leads through the non-safety CPU module 4 to the safety CPU module 7.

Both communication paths, 2, 5 and 3, 6 from the operator panel 1 to the safety CPU module 4 can be implemented on the same or different physical layer(s), if required, but would have to use different and independent communication protocols.

The safety CPU module 7 includes two safety CPUs, 9 and 10, which build a 1oo2 safety architecture. 1oo2 safety architecture means that the safety function is performed if at least one of the Safety CPUs, 9 or 10, indicates a dangerous state.

Both Safety CPUs 9 and 10 are able to receive the data, meaning code and masked code, from the operator panel 1 through two diverse and independent communication paths, 2, 5 and 3, 6, respectively, which go through the non-safety CPU module 4.

The safety CPU module 7 is able to send data, meaning code and masked code, to the operator panel 1 through two diverse and independent communication paths, 2, 5 and 3, 6, in a consistent way, which means that 1oo2 safety architecture is also used for data verification before it is sent to the operator panel 1.

A synchronization channel 8 is used between the safety CPUs 9 and 10 to synchronize their received data, meaning code and masked code, and verify the data, code and masked code, to be sent to the operator panel 1. There are unique stored reference code values on both Safety CPUs 9 and 10, which can be used to verify received code(s) and masked code(s), received from the operator panel(s) 1.

The system 100 includes an operator panel 1, or more than one Operator Panels, if required, connected to the PLC (Programmable Logic Controller) 11 which includes a non-safety CPU module 4 and a safety CPU module 7. The operator Panel 1 has two communication paths to the safety CPU module 7 through the non-safety CPU module 4. Those communication paths are different to each other, e.g., they use different communication protocols, and go through the non-Safety CPU module 4 to the safety CPU module 7 to transfer code and masked code values in both directions, based on a selection on the operator panel. Each communication path can be split in two parts, respectively, 2, 5 and 3, 6: Part 1, from the operator panel to the non-safety CPU 4, and Part 2, through the non-safety CPU module 4 to the safety CPU module 7. Both communication paths, 2, 5 and 3, 6, from the operator panel 1 to the safety CPU module 4 can be implemented on the same physical layer, if required, but would have to use different and independent communication protocols. The safety CPU module 7 includes two safety CPUs 9 and 10 which build a 1oo2 safety architecture. 1oo2 safety architecture means that the safety function is performed if at least one of the safety CPUs 9 or 10 indicates a dangerous state. Both safety CPUs 9 and 10 are able to receive the data, code and masked code, from the operator panel 1 through two diverse and independent communication paths, 2, 5 and 3, 6, respectively, which go through the non-safety CPU module 4. The safety CPU module 7 is able to send data, code and masked code, to the operator panel 1 through two diverse and independent communication paths 2, 5 and 3, 6 in a consistent way, which means that the 1oo2 safety architecture is also used for data verification before it is sent to the operator Panel 1.

The synchronization channel 8 is used between the safety CPUs 9 and 10 to synchronize their received data, code and masked code, and verify the data, code and masked code, to be sent to Operator Panel 1. There are stored reference code values on both Safety CPUs 9 and 10, which can be used to verify received code(s) and masked code(s) from the operator panel(s) 1.

After a user selection on the Operator Panel 1, the stored code (e.g., numerical value) and masked code, wherein masking is the act of applying a mask to a value, reaches the Safety CPU module 7 of the PLC (Programmable Logic controller) 11 on two different and independent communication paths 2, 5 and 3, 6 respectively. In data masking, the format of data remains the same, but the values are changed. The data may be altered for masking in a number of ways, including encryption, bitwise operations, etc.

Both communication paths 2, 5 and 3, 6 shall not necessarily be realized as safety communications. Thus, dangerous data corruptions of the code and masked code can theoretically occur. Safety CPU module takes care for error detection including the function of comparing the received code and masked code. Note: The masked code is demasked before comparison against code and stored reference code.

For error detection, in the safety CPU module 7, predefined code reference values for each user selection are safely stored, for example in a flash memory on each of the Safety CPUs 9 and 10. These stored code reference values are compared with the received code from the operator panel(s) 1 through a first communication path 1 (2, 5). The comparison takes place in the safety application program running on both Safety CPUs 9 and 10 including the cross-check for end-result through synchronization channel 8 between Safety CPUs 9 and 10. If the received code does not correspond to the stored code reference value, it is detected as an error on Safety CPU module 7.

In addition to the code itself, the masked code, masked by e.g., using bitwise XOR operations, is sent through the second communication path 2 (3, 6) to the safety CPU module 7. On the safety CPU module 7, the incoming masked code is demasked again, so that it can be compared with the valid received code, wherein valid means that it was equal to the stored reference code value, sent via communication path 1.

The comparison takes place again in the safety application program running on both Safety CPUs 9 and 10 including the cross-check for end-result through synchronization channel 8 between Safety CPUs 9 and 10. Only if the comparison of valid received code through the first communication path 1 and masked code through the second communication path 2 is successful, the user selection is accepted for its further confirmation by the end-user, as it is described in FIGS. 2-5. The confirmation of user selection through operator panel 1 is realized in the same way as for selection procedure, which means that code and masked code values are used for sending through communication paths 1 and 2, respectively, and compared on arrival against stored code reference values on safety CPUs 9 and 10.

Looking now to FIGS. 2 to 5 together with FIGS. 1 and 6, the method according to the invention in an exemplary embodiment will be explained.

Figure 2:
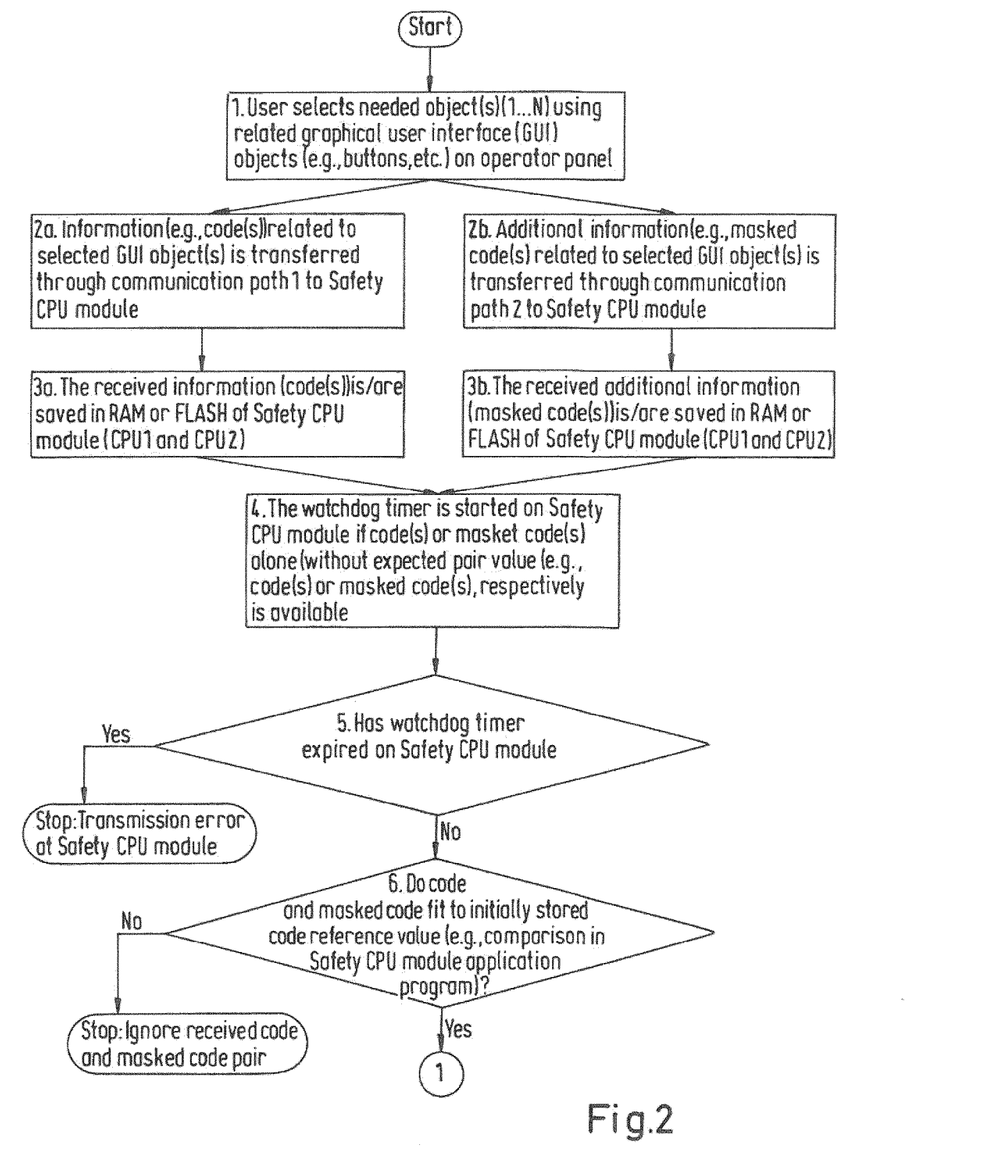
FIG. 2-5 the steps of the method for safety-relevant input to a control system, according to an embodiment of the invention.

The method starts in step 1 with the user to select one or more needed objects(s) 1 . . . N using the related graphical user interphase (GUI) objects on the operator panel 1, for example buttons or the like.

Next, two things happen in parallel. In step 2*a* information, for example code(s), related to the selected GUI object(s) is transferred through a first communication path, 2 and 5 in FIG. 1, to the safety CPU module 7 of PLC 11. There, see step 3*a*, the received information, the code(s), is/are saved in a RAM or a FLASH memory of one or both the Safety CPU module(s) 9, 10.

In step 2*b*, parallel to step 2*a*, additional information, for example masked code(s), related to the selected GUI object(s) is transferred through a second communication path, 3 and 6 in FIG. 1, to the safety CPU module 7 of PLC 11. There, see step 3*b*, the received additional information, the masked code(s), is/are saved in a RAM or a FLASH memory of one or both the Safety CPU module(s) 9, 10.

Now in step 4 the watchdog timer is started on the safety CPU module if the code(s) or masked code(s) alone, without an expected pair value, e.g. code(s) or masked code(s) respectively, is available.

An interrogation loop in step 5 gives a STOP signal and issues a "transmission error at Safety CPU Module" signal if the watchdog timer time has expired without results.

As long as the watchdog timer runs, in step 6 another interrogation loop checks if the code and masked code do fit to initially stored code reference values. This is done e.g. by comparison in the safety CPU application program in the safety CPU program memory. In case there is a misfit, a STOP signal is created and the received code and masked code pair is ignored for further procedure.

Figure 3:
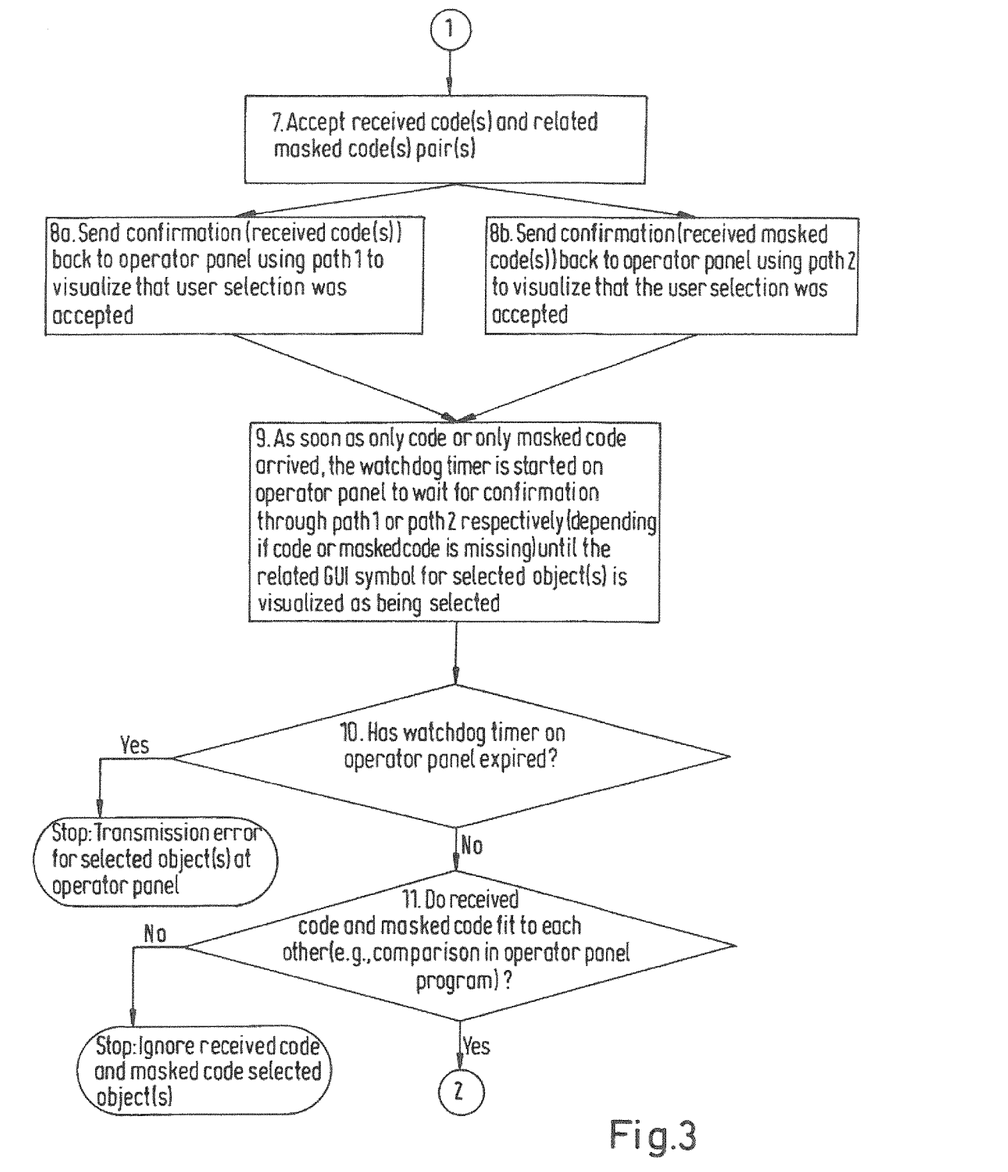

In case step 6 results in a fit, the method proceeds with step 7, see FIG. 3. Received code(s) and related masked code(s) pairs are accepted.

A confirmation that code(s) are received is sent back to the operator panel 1 using the first communication path 2, 5 to visualize that the used selection was accepted, see step 8*a*.

In parallel, a confirmation that masked code(s) are received is sent back to the operator panel 1 using the second communication path 3, 6 to visualize that the used selection was accepted, see step 8*b*.

A soon as only code or only masked code has arrived, a watchdog timer is started on the operator panel 1 to wait for confirmation through the first or second communication path respectively, depending on if code or masked code is missing, until the relevant GUI symbol for selected object(s) is visualized as being selected, see step 9.

In step 10, an interrogation loop checks if the watchdog timer on the operator panel 1 has expired before the desired confirmation came. In case this is so, a STOP signal is issued, notifying of a transmission error for selected object(s) at the operator panel 1.

If the watchdog time has not expired yet, an interrogation loop, see step 11, checks if the received code and the masked code fit to each other, for example by comparison executed in a software module as part of the operator panel application program.

In case there is a misfit, a STOP signal is created to ignore the received code and masked code of the selected object(s).

Figure 4:
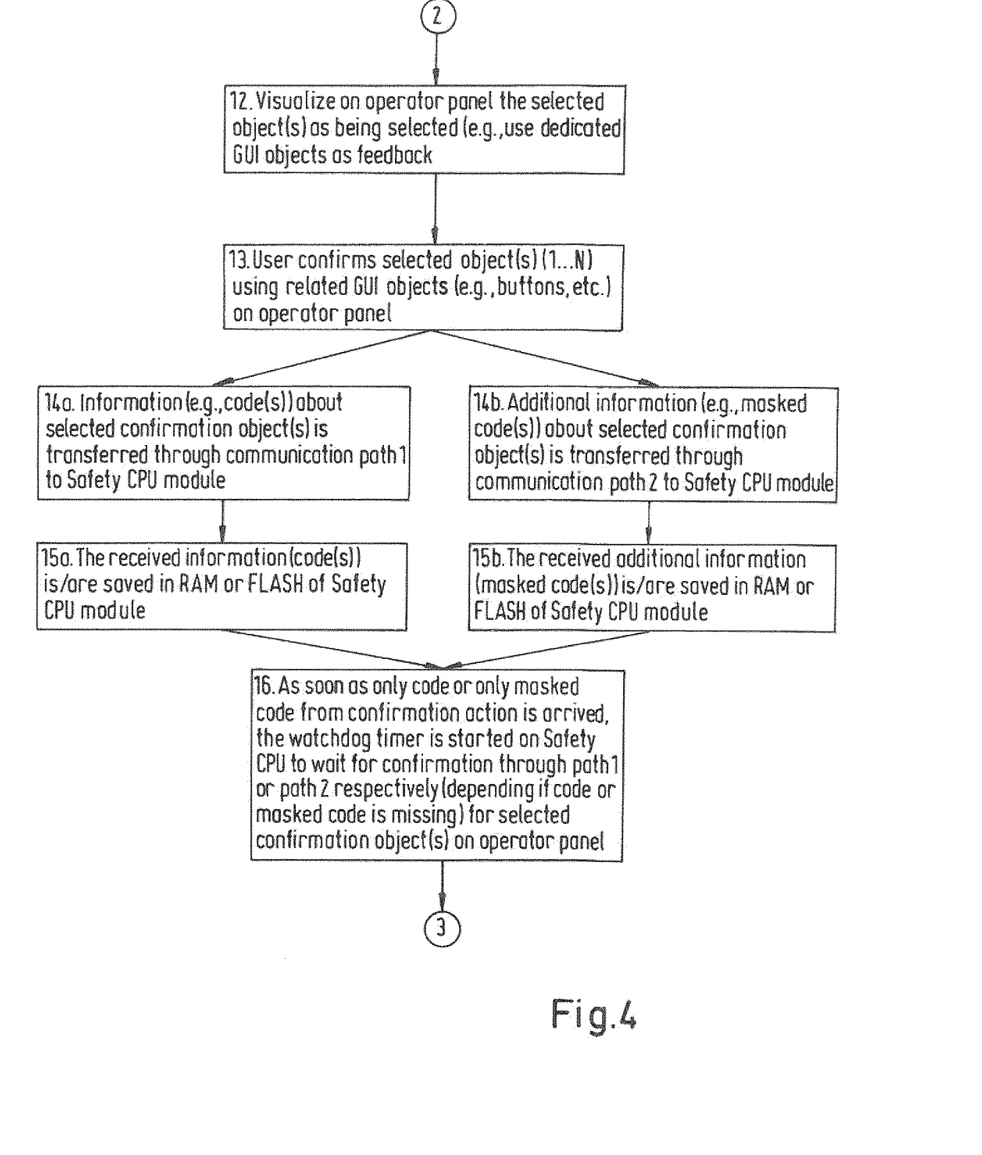

In case step 11 results in a fit, the method proceeds with step 12, see FIG. 4.

Figure 6:
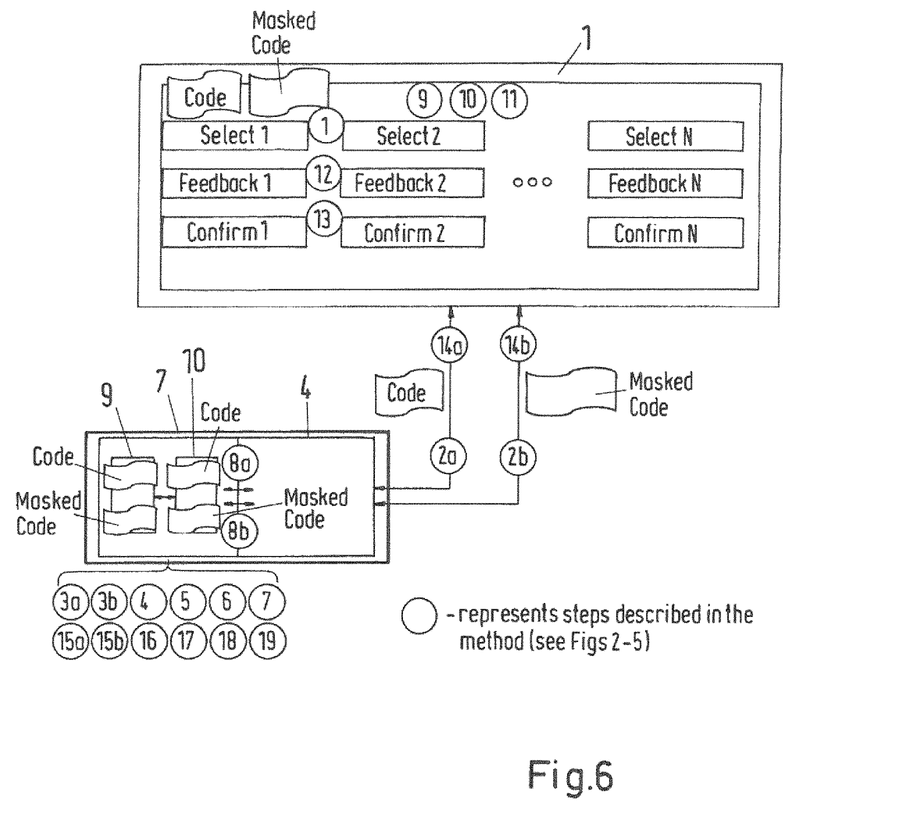
FIG. 6 schematically and exemplarily the user interface of the operator panel according to an embodiment of the invention.

In this step, on the operator panel 1, the selected object(s) are visualized as being selected, e.g. by use of dedicated GUI objects as feedback, see FIG. 6, second row in operator panel 1.

In the following step 13, the user confirms the selected object(s), 1 . . . N, using related GUI objects, e.g. buttons etc., on the operator panel 1, see FIG. 6, third row.

Now again two things happen in parallel.

In step 14a information, for example code(s), about selected confirmation object(s) is transferred through the first communication path, 2 and 5 in FIG. 1, to the safety CPU module 7 of PLC 11. There, see step 15a, the received information, the code(s), is/are saved in a RAM or a FLASH memory of Safety CPU module(s) 9, 10.

In step 14b, parallel to step 14a, additional information, for example masked code(s), about the selected confirmation object(s) is transferred through the second communication path, 3 and 6 in FIG. 1, to the safety CPU module 7 of PLC 11. There, see step 15b, the received additional information, the masked code(s), is/are saved in a RAM or a FLASH memory of Safety CPU module(s) 9, 10.

A soon as only code or only masked code from the confirmation action has arrived, the watchdog timer is started on the safety CPU 7 to wait for confirmation through the first or second communication path respectively, depending on if code or masked code is missing, for the selected confirmation object(s) on the operator panel 1, see step 16.

Figure 5:
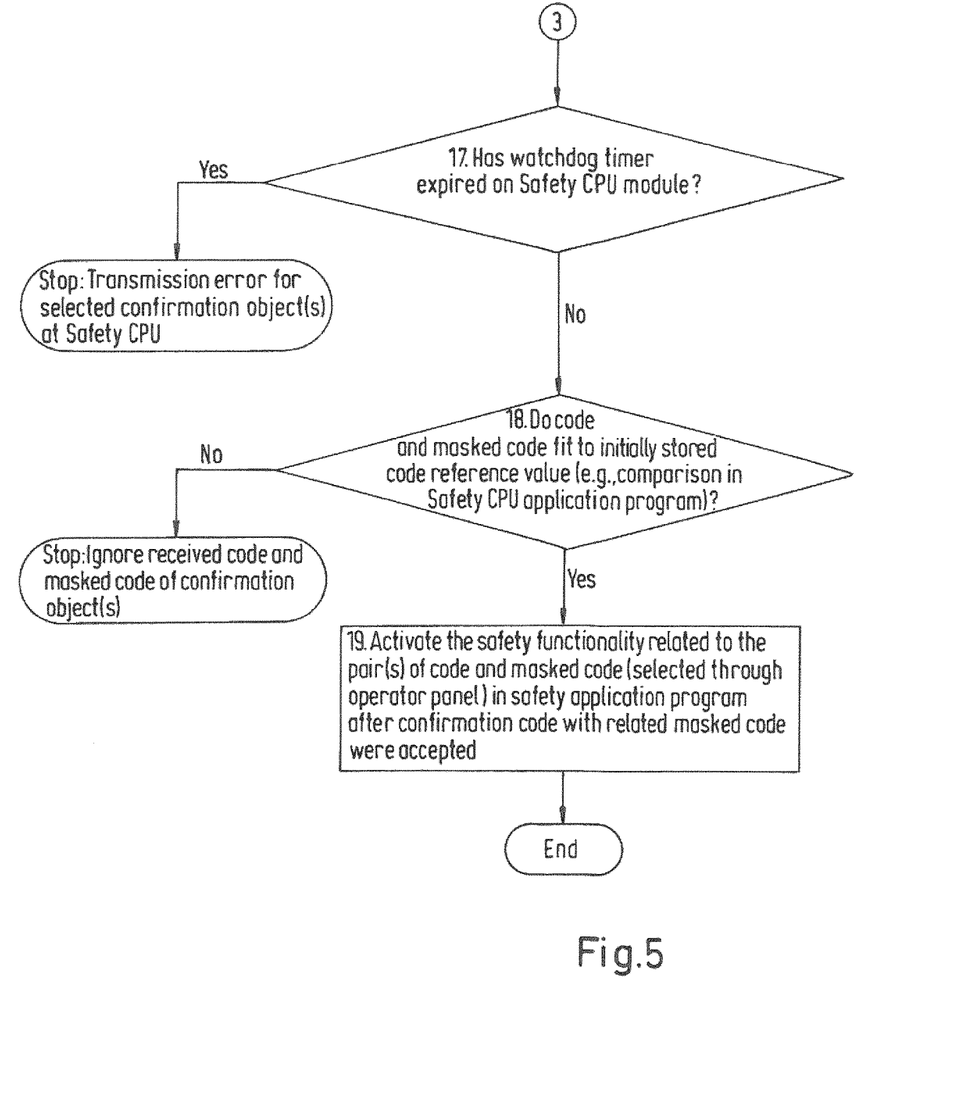

In the following step 17, see FIG. 5, an interrogation loop checks if the watchdog timer on the safety CPU 7 has expired before the desired confirmation came. In case this is so, a STOP signal is issued, notifying of a transmission error for selected confirmation object(s) at the safety CPU 7.

If the watchdog time has not expired yet, an interrogation loop, see step 18, checks if the code and the masked code fit to the initially stored code reference value, for example by comparison executed in a module as part of the safety CPU application program.

In case there is a misfit, a STOP signal is created to ignore the received code and masked code of the confirmation object(s).

In case step 18 results in a fit, the method proceeds with final step 19. This activates the safety functionality related to the pair(s) of code and masked code, selected through the operator panel, in the safety application program, after the confirmation code with the related masked code were accepted.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE SIGNS 1 operator panel
2 first communication path from operator panel to PLC
3 second communication path from operator panel to PLC
4 non-safety CPU module
5 first communication path from non-safety CPU module to safety CPU module
6 second communication path from non-safety CPU module to safety CPU module
7 safety CPU module
8 synchronization channel
9 first safety CPU
10 second safety CPU
11 PLC
12 non-safety process
13 functional safety of process
14 process or machine
100 system

The invention claimed is:

1. A method for safety-relevant input to a control system, the control system including a non-safety control module configured to control non-safety processes, and a safety control module configured to control functional safety of processes, the method comprising, using an operator panel for user selection of safety-related object input:

selecting a safety-related object on the operator panel;
transferring object code and masked object code between the operator panel and the safety control module in both directions;
using two different communication paths, a first communication path for the object code and a second communication path for the masked object code, each communication path going through the non-safety control module; and
using reference code values stored on the safety control module for verifying for correctness the object code and the masked object code received in the safety control module.

2. The method of claim 1, wherein each communication path uses a different communication protocol.

3. The method of claim 2, wherein each communication path is built on the same physical layer.

4. The method of claim 2, wherein each communication path is built on different physical layers.

5. The method of claim 2, wherein each communication path is not realized as a safety communication path.

6. The method of claim 1, wherein the safety control module includes a first and a second safety CPU, which build a 1oo2 safety architecture.

7. The method of claim 1, further comprising:
comparing the masked object code is demasked in the safety control module and the reference code values with received object code and masked object code after demasking; and
detecting an error in case the received codes do not correspond to the reference code value.

8. A system for safety relevant input to a control system, the control system including a PLC including a non-safety control module configured to control non-safety processes, and a safety control module configured to control functional safety of processes, the system comprising:
an operator panel configured for user selection of safety-related object input;
a first and second communication paths between the operator panel and the safety control module,
wherein each of the communication paths uses a different communication protocol,
wherein each communication path goes through the non-safety control module to and from the safety control module,
wherein the first communication path transfers object code and the second communication path transfers masked object code.

9. The system of claim 8, wherein both communication paths are implemented on the same physical layer.

10. The system of claim 8, wherein the safety control module includes a storage module for storing pre-defined code reference values for each user selection.

11. The system of claim 10, wherein the safety control module includes a program memory for storing a safety application program, which program is configured to compare the user selection received in the safety control module from the operator panel with the stored code reference values and to detect an error in case the received user selection does not correspond to the stored code reference value.

12. The system of claim 11, wherein the safety application program is configured to demask the incoming masked object code and compare the demasked object code with the code and with the stored code reference values and to detect an error in case the demasked object code does not correspond to the code and stored code reference value.

13. The system of claim 8, wherein the safety control module includes a first and a second safety CPU which build a 1oo2 safety architecture.

14. The system of claim 8, wherein more than one operator panels are connected to the control system.

15. The system of claim 8, wherein more than one control system is connected to the operator panel.

* * * * *